Oct. 16, 1934.    R. O. HAMILL    1,977,581
MAXIMUM DEMAND METER
Filed Aug. 14, 1933    5 Sheets-Sheet 1

R. O. Hamill  INVENTOR-
BY
Thomas Howe  ATTORNEY-

Oct. 16, 1934.  R. O. HAMILL  1,977,581
MAXIMUM DEMAND METER
Filed Aug. 14, 1933   5 Sheets-Sheet 2

R. O. Hamill INVENTOR-
BY
Thomas Howe ATTORNEY-

Oct. 16, 1934.  R. O. HAMILL  1,977,581
MAXIMUM DEMAND METER
Filed Aug. 14, 1933    5 Sheets-Sheet 3

R. O. Hamill  INVENTOR-
BY
Thomas Howe  ATTORNEY-

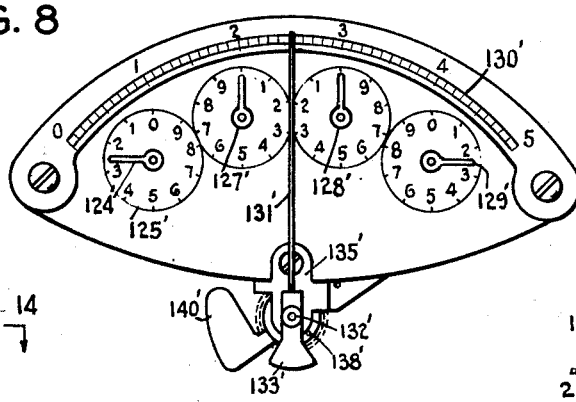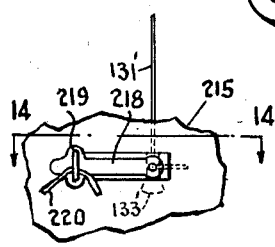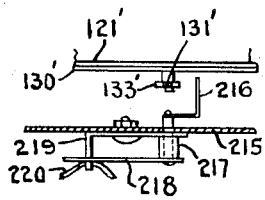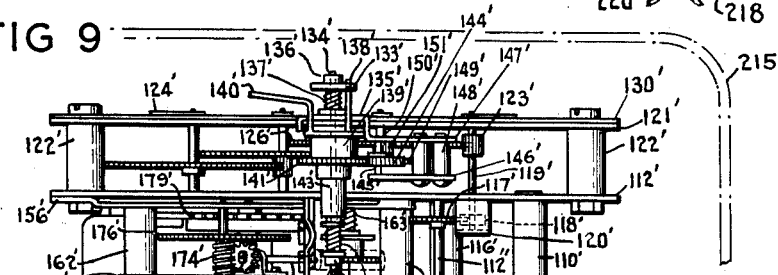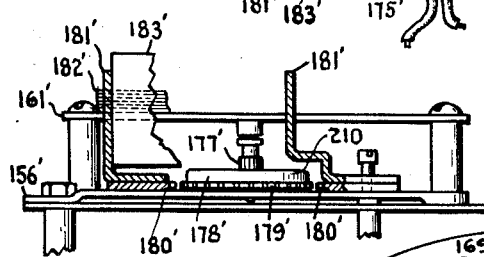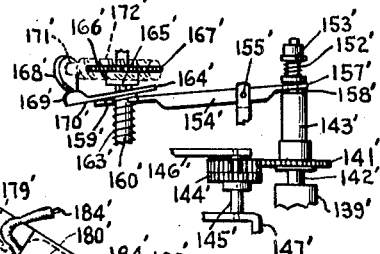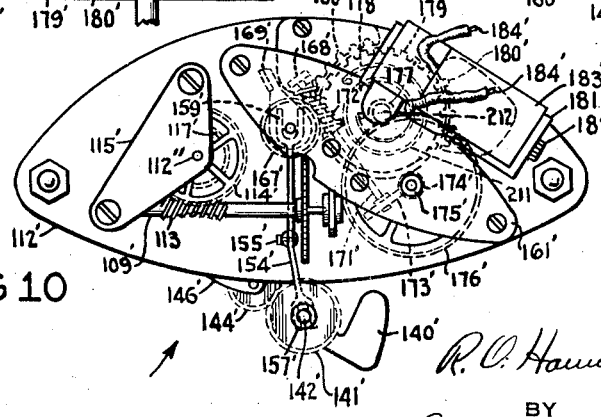

Oct. 16, 1934.   R. O. HAMILL   1,977,581
MAXIMUM DEMAND METER
Filed Aug. 14, 1933    5 Sheets-Sheet 5

R. O. Hamill INVENTOR
BY
Thomas Howe ATTORNEY

Patented Oct. 16, 1934

1,977,581

UNITED STATES PATENT OFFICE 1,977,581

MAXIMUM DEMAND METER

Ret O. Hamill, New York, N. Y., assignor, by mesne assignments, of thirty-eight per cent to said Hamill, thirty-one per cent to Arthur Autler, and thirty-one per cent to Grover Autler, New York, N. Y.

Application August 14, 1933, Serial No. 684,972

14 Claims. (Cl. 171—34)

The present invention relates to means applicable to electric metering apparatus, whereby the maximum consumption of electric energy at any time during a given period may be ascertained. Integrating watt meters for indicating the total watts of electric energy which have passed through the meter, are well known. Such indication, however, takes no account of how the use of the current was distributed throughout the period. There may have been a very large amount of energy used during some intervals of time and a comparatively small amount used during other intervals of time. The integrating watt meter, however, takes no account of this but adds up the wattage used and indicates the sum thereof. It has been found, however, that it is desirable to know the maximum instantaneous demand for power made as it may have an important bearing upon the rate of charge and be of importance in other particulars.

It is the main object of the present invention to provide an improved means for indicating the maximum energy demand.

Other and ancillary objects of the invention will appear hereinafter.

In the accompanying drawings which illustrate the invention—

Figure 5:
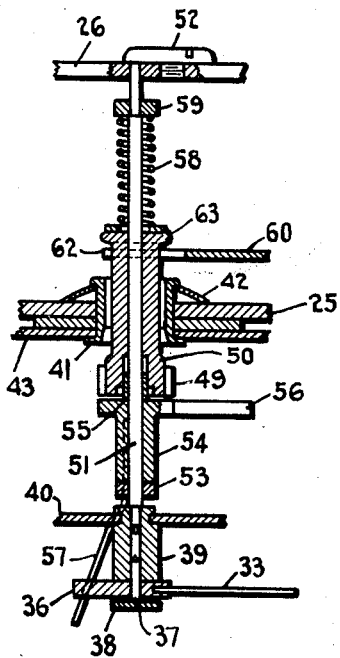
Figure 4:
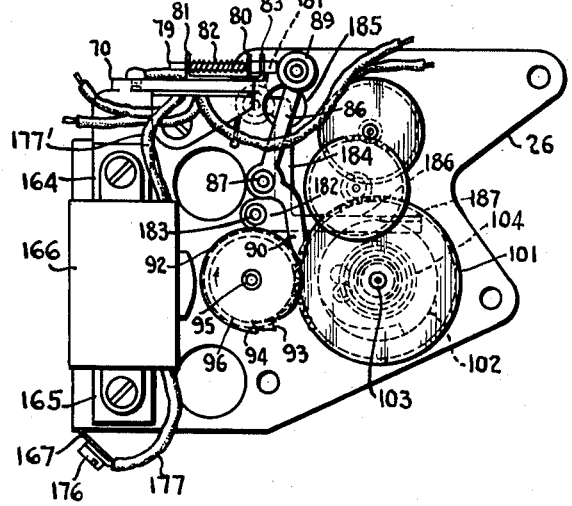
Figure 6:
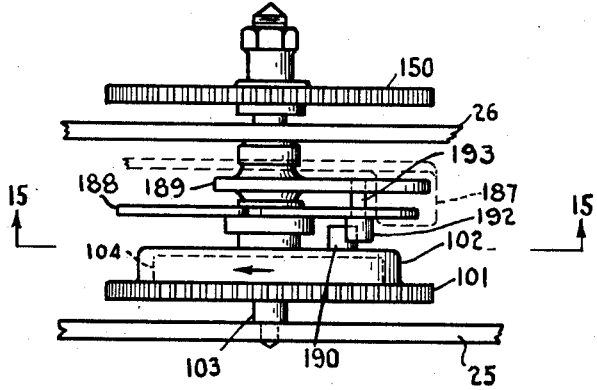
Figure 7:
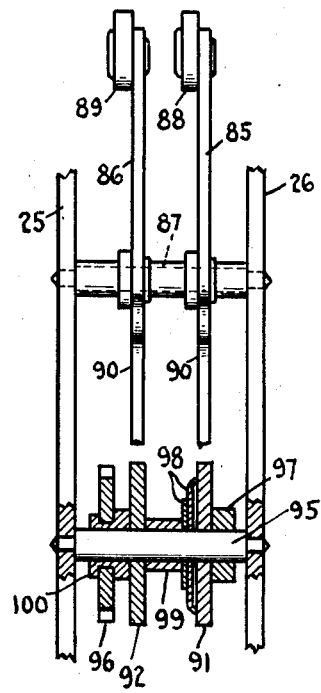
Figure 15:
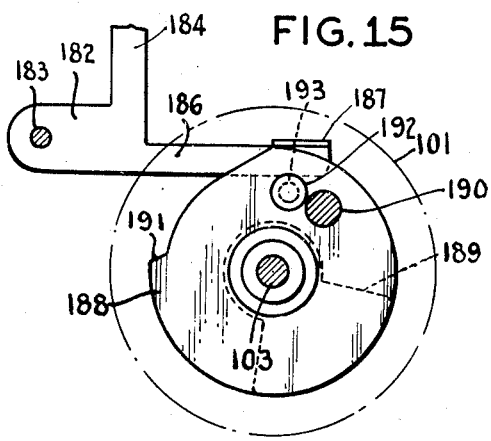
Figure 16:
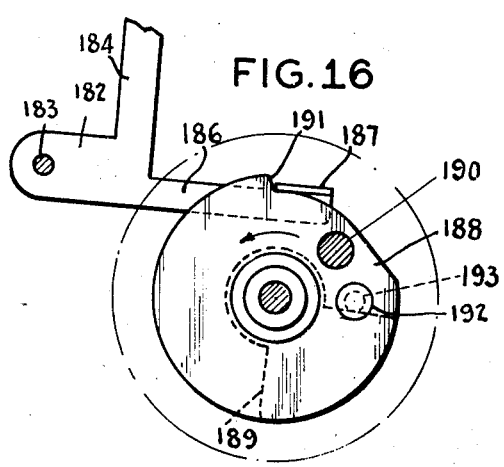
Figure 17:
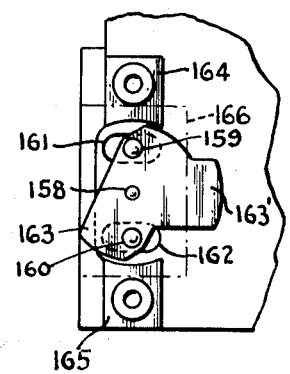
Figure 18:
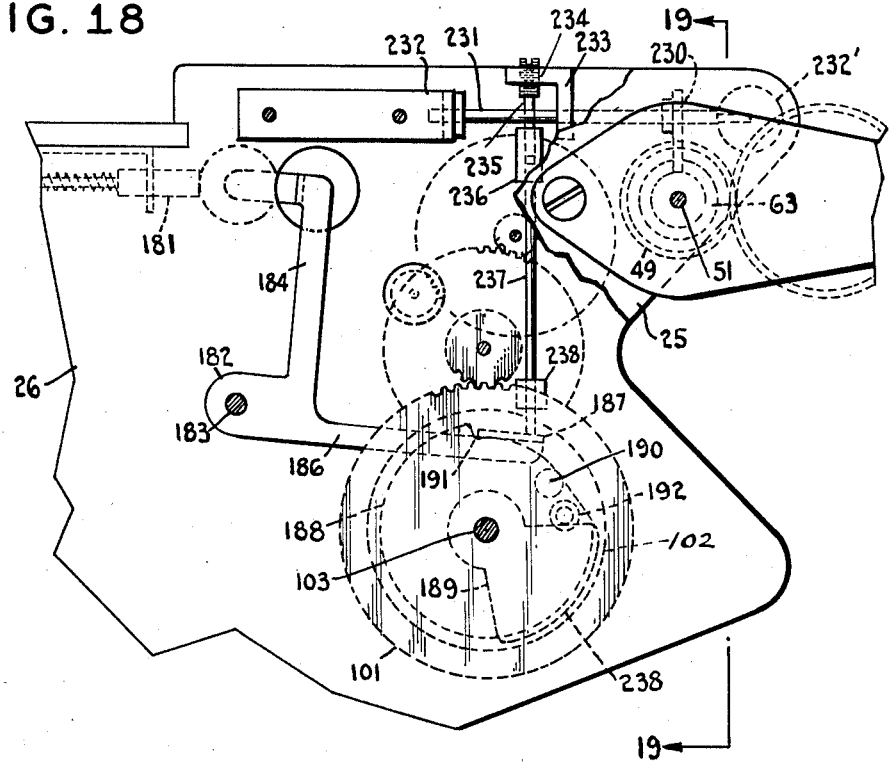
Figure 19:
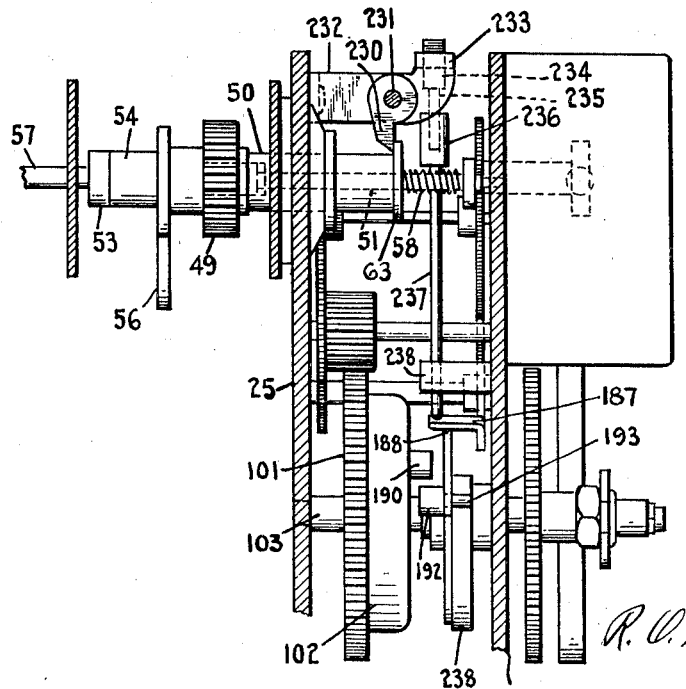

Fig. 4 is a front elevation of the apparatus mounted in plate 26, some of the parts being omitted, the plate 25 and all apparatus carried thereby independently of the plate 26 being removed;

Fig. 5 is a section, on an enlarged scale, through the axis of the maximum demand pointer and the apparatus for operating the same, certain of the parts being broken away, this view showing the manner of connection and disconnection of the maximum demand indicator operator with its actuating means;

Fig. 6 is a fragmentary top plan view of the means for controlling the winding of the spring for driving electric controlling contacts as will be hereinafter explained;

Fig. 7 is a side elevation, on an enlarged scale, partly in section, of the tappets for controlling the circuit of the electro-magnet operating the connection of the maximum demand indicator actuator with its driving means, and the cams for operating such tappets, certain of the parts being shown in section;

Fig. 8 is a front elevation of mechanism including a maximum demand indicator especially adapted for use in connection with alternating currents;

Fig. 9 is a bottom plan view of the apparatus of Fig. 8, the usual front meter cover being shown in dotted lines and partly broken away;

Fig. 10 is a rear elevation of the apparatus of Fig. 8;

Fig. 11 is a fragmentary view, on an enlarged scale, showing a section through the motor for driving and timing the clutch securing means for connecting the maximum demand indicator actuator with its driving means;

Fig. 12 is a fragmentary view, on an enlarged scale, showing the means whereby the motor operates the clutch controlling the connection of the actuator for the maximum demand indicator with its driving means;

Fig. 13 is a front view of the meter cover showing mounted thereon the reset means for the maximum demand indicator;

Fig. 14 is a section on the line 14—14 of Fig. 13;

Figs. 15 and 16 are sections on the line 15—15 of Fig. 6, showing the position of the parts at the beginning and ending respectively of the rewinding of the spring for driving the contacts controlling the magnet which actuates the driving connection between the actuator for the maximum demand indicator and its driving means;

Fig. 17 is a fragmentary view showing, in enlarged elevation, a view of the electro-magnet, its pole pieces and armature, for winding the driving spring for operating the contacts controlling the electro-magnet which in turn controls the connection of the maximum demand indicator operator with its driving means;

Fig. 18 is a fragmentary view, in elevation, showing a modified form of clutch-operating mechanism; and Fig. 19 is a section on the line 19—19 of Fig. 18.

Referring to the drawings, and first to Figs. 1 to 7 inclusive, 15, 16 and 17, 1 is a vertical armature shaft of the well-known motor-operated type of integrating watt-hour-meter which rotates at a rate according to the quantity of electricity (watt-hours) to be measured. The mechanism for driving and controlling such shaft being well known, it is unnecessary to illustrate it.

The meter motor may be of the direct current type for measuring direct current, and under such circumstances, direct current is available for operating the maximum demand indicating mechanism and the mechanism of Figs. 1 to 7, 15, 16 and 17 is shown as being adapted for use with direct current although it may be used with alternating current.

Fixed to and rotating with the shaft 1 is the worm 2 which is in driving relation to the worm gear 3 fixed upon the shaft 4. Fixed to the shaft 4 is a radially extending arm 5 in the path of which, as it rotates, is a projection 6 fixed upon the shaft 7 rotatably mounted in the plates 8 and 9. Fixed upon the shaft 7 is the gear 10 meshing with the gear 11 fixed upon the rotatable shaft 12. Also fixed upon the shaft 12 is a gear 10' meshing with the gear 11' fixed upon the rotatable shaft 12' upon which is fixed the pointer 16 rotating over the dial 20 and which is connected by a suitable train of gearing with the pointers 13, 14 and 15 rotating respectively over the dials 17, 18 and 19 to indicate the watt-hours consumed in a manner well known in connection with integrating watt-hour meters. The plates 21, 22 and 23 in which the gearing, pointers and shafts thus far referred to are mounted, are secured together and spaced apart by suitable posts, the plates 21 and 22 being secured and spaced by the posts 24 and the plates 22 and 23 by the posts 24'. The construction thus far referred to is well known so that it need not be further referred to.

To provide the maximum demand indication there is added to the usual integrating watt-hour meter construction, apparatus described as follows:

The maximum demand indicating mechanism is mounted upon two plates 25 and 26. The usual watt-hour integrating registering mechanism mounted on the plates 21, 22 and 23 is in a watt-meter without the maximum demand indicator, secured directly to the frame by screws 27, 28, 29 and 30 passing through the tubular posts 24 at the corners of the register and screwed into the frame. To attach the maximum demand indicating mechanism, the screws 27, 28, 29 and 30 are withdrawn from the tubular posts and the integrating register mounted upon the plates 21, 22 and 23 is removed. The maximum demand indicating mechanism mounted in the two plates 25 and 26 is placed in position, and the usual integrating registering mechanism which has just been referred to as having been removed, is placed in position outside the maximum demand indicator. The screws 27, 28, 29 and 30 are then reintroduced through the posts 24 and through suitable openings in the maximum demand indicator and are screwed into their holes in the meter frame.

In front of the dials 17, 18, 19 and 20 of the usual integrating watt-hour-meter, is mounted a transparent plate 31 of celluloid or other suitable material, which plate carries the maximum demand scale 32 over which the maximum demand pointer 33 is adapted to move. The scale plate 31 is spaced from the usual watt-meter dial plate 34 by means of hollow posts 35, the screws which secure the watt-meter integrating and maximum indicating mechanisms passing through the posts 35 and also securing in position the scale plate 31. The usual integrated readings on the dials 17, 18, 19 and 20 may be observed through the transparent plate 31.

The maximum demand pointer 33, having a counterbalancing weight 36, is pivoted at 37 between the outer end of the bracket 38 and the boss 39 fixed in the plate 40 forming one side of a carrier pivoted in the plate 25 by a hollow rivet 41, the carrier being frictionally held in any position to which it may be turned by a spring washer 42 interposed between the plate 25 and the head of the rivet. This rivet is fixed to the other plate 43 of the carrier. This plate 43, together with the plate 40 and the posts 44, which secure the plates together and space them apart, constitute the pivoted carrier referred to. The bracket 38 is of spring material pressing against the bearing of the pointer 33 so as to frictionally hold it in whatever position it may be placed.

Rotatably mounted in the plates 40 and 43 is the shaft 45 upon which are fixed the spur gears 46 and 47. The gear 47 engages with the spur gear 48 of the train operating the watt integrating hands 13, 14, 15 and 16, while the gear 46 meshes with a gear 49 fixed upon the sleeve 50 (see Fig. 5) which is rotatably mounted on the shaft 51 supported at its ends in the plates 26 and 40. The shaft is prevented from shifting endwise, whereby it might be removed from one or more of its bearings, by the stop 52 secured to the plate 26 and bearing against the end of the shaft 51.

Fixed upon the shaft 51 is a collar 53. Rotatably mounted upon the shaft is a sleeve 54 prevented from endwise movement by the collars 53 and 55 fixed on the shaft 51, between which collars it is located. Fixed to the sleeve 54 and extending laterally therefrom is the return weight 56 which is biased by gravity to an initial position and serves to restore the operator for the maximum demand pointer, to its initial position. The operator for the maximum demand pointer is a projection 57 fixed to the sleeve 54 and projecting into the path of the maximum demand pointer 33 and serving to operate that pointer in a manner as will be hereinafter pointed out.

The sleeve 50 is pressed endwise against the end of the sleeve 54 by means of a spring 58 interposed between the end of the sleeve and a collar 59 fixed upon the shaft 51. This spring 58 tends to force the end of the sleeve 50 against the end of the sleeve 54 and thereby produce a frictional driving engagement between the sleeves 50 and 54 whereby the driving through the gear 49 will operate to turn the sleeve 54 and thereby raise the weight 56.

An iron or steel lever 60 pivoted at 61 on the plate 25 has a forked end 62 embracing the sleeve 50 within the head or flange 63. This lever is adapted to be pressed against the head 63 by means of a spring 64 which is strong enough to overcome the spring 58 and push the lever and the sleeve 50 against the collar 59. Such sliding of the sleeve 50 along the shaft 51 against the pressure of the spring 58 will result in the separation of the sleeves 50 and 54 whereby the sleeve 54 and the operator 57 for the maximum demand pointer will be free to return to their initial position under the gravity of the weight 56. The shoulder formed by the collar 55 prevents any following by the sleeve 54 of the sleeve 50 which might be occasioned by adherence of the two sleeves, and ensures the breaking of the clutching connection between the sleeves 50 and 54 when the sleeve 50 is moved to accomplish that purpose. The end of the lever 60 which is opposite the forked end 62 is adapted to be acted upon by an electro-magnet 65 which is mounted on the plate 25 and when energized is adapted to attract the adjacent end of the lever 60 against the pressure of the spring 64 so as to relieve the inside of the flange 63 of the pressure of the forked end 62 of the lever so that the sleeve 50 is slid endwise of the shaft 51 by means of the spring 58 and the sleeves 50 and 54 are brought into frictional engagement. When the magnet 65 is deenergized the lever is released and, under the action of the spring 64, presses against the head 63, thereby forcing the sleeve 50 endwise against the pressure of the spring 58 and disengaging the sleeves 50 and 54 from frictional engagement. When these sleeves are in frictional engagement the weight 56, sleeve 54 and maximum demand pointer operator 57 will be moved by the power transmitted through the gear 49 from the integrating meter mechanism and will fall back to the initial position to which they are initially biased by the gravity of the weight 56, when the sleeves 50 and 54 are disengaged.
It will now appear that the weight 56, sleeve 54 and maximum demand pointer operator 57 will be driven through the gear 49 so long as the electromagnet 65 is energized and will be returned to their initial position when the magnet 65 is deenergized.

In order to effect the desired maximum-demand indication, timed electrical control means controls the energization of the magnet 65, causing it to be energized for a given predetermined period during which the maximum-demand pointer operator is moved and at the end of such period the electro-magnet is deenergized for the momentary period necessary to permit the return of the maximum-demand pointer operator to its initial position under the action of the weight 56. After such momentary deenergization of the magnet 65, it is again energized and the driving of the maximum-demand pointer operator is again continued for the predetermined time interval when it is again deenergized permitting the return of the pointer operator to its initial position and so on indefinitely.

The timing mechanism by which the energization of the electro-magnet 65 is accomplished will now be described:

The leads 66 and 67 from the terminals of the magnet 65 are respectively connected with the connection posts 68 and 69 mounted on the plate 70 of insulating material which is mounted upon the plates 25 and 26. The two leads to the source of electrical supply are connected with the binding posts 69 and 71 respectively. The binding post 71 is connected with the metal bracket 72 mounted upon the plate 70 by means of a conducting strip
73. Sliding in the bracket 73 is a metal plunger 74 upon which is spring mounted the contact 75, a spring 74' being interposed between the said contact 75 and the ear 76 of the bracket, such spring serving to force the contact towards the end ear 77 of the bracket.

Also mounted upon the plate 70 is another metal bracket 78 in which slides the metal plunger 79 having mounted upon it the spring contact 80 adapted to engage with and be disengaged from the contact 75. Between the ear 81 at one end of the bracket, and the contact 80, is interposed a spring 82 tending to force the contact 80 towards the ear 83 at the other end of the bracket. The bracket 78 is electrically connected with the binding post 68 by means of the conducting strip 84.

It will now be seen that when the contacts 75 and 80 are in engagement, circuit will be made from the binding post 69, connected with one side of the source of supply, through the electro-magnet 65 to the binding post 68 thence through the strip 84, bracket 78, contacts 80 and 75, bracket 72, and conducting strip 73 to the binding post 71 which is connected with the other side of the source of electrical supply. It will also be seen that when the contacts 75 and 80 are separated the circuit of the electro-magnet will be broken and the magnet will be deenergized.

The means for operating the contacts 75 and 80 to effect the proper timing of the energization and deenergization of the magnet 65, comprises two tappets 85 and 86 pivoted upon the stud 87, mounted in the plates 25 and 26 (see Figs. 2, 4 and 7) and carrying at their ends, respectively, the rotatably mounted insulating rollers 88 and 89 adapted to bear, respectively, against the ends of the plungers 74 and 79. The tails 90 of the respective tappets bear upon the peripheries of the cams 91 and 92. These cams have circular peripheries except for the notches 93 and 94 (see Fig. 4) formed therein. The cams 91 and 92 are rotatably mounted upon the shaft 95 which in turn is rotatably mounted in the plates 25 and 26. Fixed upon the shaft 95 is the pinion 96 and the cams 91 and 92 are frictionally held to the shaft, the cam 91 being forced against the collar 97 fixed on the shaft 95 by means of a spring washer 98 interposed between the last mentioned cam and the end of the sleeve 99 sliding upon the shaft 95 and bearing at its other end against the cam 92 and forcing the same against the boss 100 of the pinion 96. The cams are thus frictionally held to the shaft sufficient to cause them to be driven thereby to operate the tappets, but by the application of unusual force these cams may be adjusted about the shaft 95. The cams are so adjusted about the shaft 95 that the notches 93 and 94 are staggered. The circular peripheries of the cams force the plungers 74 and 79 against the springs 74' and 82 with the contacts 75 and 80 in engagement. As the cams turn (in the direction as indicated by the arrow) the tail of the tappet 85 will drop off the shoulder formed by the notch 94 when the plunger 74 and the contact 75 will be released so as to move under the action of the spring 74' to separate the contacts 75 and 80 and open the circuit of the magnet 65, the plunger 79 and contact 80 being meanwhile held against such movement by reason of the tail of the tappet 86 still riding upon the circular periphery of its cam. When the cams have turned far enough the tail of the tappet 86 will drop into its notch 93 and, the tails of the two tappets riding up on the circular peripheries of their cams, will cause the contacts 75 and 80 to be in engagement and make the circuit of the magnet 65, which circuit is maintained until the contacts 75 and 80 are separated by the dropping of the tail of the tappet 85 off the shoulder of the notch 94. The staggering or displacement of the notches 93 and 94 is made such as to maintain the magnet deenergized for only such time as is necessary to permit the maximum demand pointer operator to return to its initial position.

The shaft 95 on which the cams are mounted is driven by reason of the meshing of the pinion 96 with the pinion 101 fixed to the spring barrel 102 (see Fig. 6) rotatably mounted upon the shaft 103 journaled in the plates 25 and 26. Within the barrel is the coiled spring 104 similar to the main spring of the clock, this spring having one end fixed to the barrel and the other end fixed to the shaft 103 and furnishing the power for driving the cams for operating the tappets as described.

The rate of turning of the pinion 101 and therefore the speed of the cams 91 and 92 is controlled by means of the hair spring and balance wheel controlled escapement 105, familiar in watches and clocks, mounted upon the plate 26. This escapement is connected by a suitable train of gears 106 with the pinion 101.

In order to provide means for automatically keeping the spring 104 wound, a gear 150 is fixed on the shaft 103 and meshes with the gear 151 fixed upon the shaft 152. Also fixed upon the shaft 152 is the ratchet wheel 153 adapted to be engaged by the spring-pressed holding dog 154 pivoted in the plate 26.

The ratchet wheel is stepped forward to wind the spring by means of a spring-pressed pawl 155 pivoted in the arm 156 pivoted about the shaft 152. The arm 156 is reciprocated about the shaft 152 to reciprocate the pawl 155, by means of a lever 157 pivoted at 158 in the plate 26 and having the studs 159 and 160 fixed in it and projecting through the slots 161 and 162 in the plates 26. To these studs is fixed the iron armature 163 also pivoted at 158 in the plate 26. This armature is adapted to swing between the pole pieces 164 and 165 of the electro-magnet 166 mounted upon the plate 26. The armature 163 is normally held out of line with the pole pieces 164 and 165 by the weight 163' projecting from the side of the armature and tending to move the armature so that the roller 169 bears against the stop ear 170 fixed upon the plate 26. When the electro-magnet 166 is deenergized the arm 157 will be turned about its pivot by the weight 163' whereby the pawl 155 will be in retracted position and the armature will be out-of-line with the pole pieces, When the electro-magnet 166, however, is energized the armature will be moved into line with the pole pieces, the arm 157 will be moved against the weight 163', the arm 156 will be lifted and the dog moved forward and the ratchet wheel moved forward. When, however, the magnet is deenergized its armature will again move into the out-of-line position as regards the poles of the electro-magnet, by the weight 163' and the pawl will be retracted in readiness for another step forward when the electro-magnet is again energized.

It will now be apparent that as the electro-magnet 166 is energized and de-energized the pawl 155 will be reciprocated and step forward the ratchet wheel to turn the shaft 103 and wind up the spring 104.

The circuit of the electro-magnet 166 is formed from one side of the source of electrical supply connected to the binding post 71 through the connecting strip 73 to the bracket 71 and thence through the connecting strip 171 to one of the securing rivets 172 passing through the insulating plate 70 and securing to the under side of that plate the bracket 173 in which reciprocates the plunger 174 carrying at its end the contact 175 adapted to engage and disengage with the spring contact 167 mounted upon but insulated from the plate 26 by means of the insulating block 168. From the spring contact 167 circuit passes through terminal 176 and conductor 177 to one terminal of the electro-magnet 166. The other terminals of the electro-magnet is connected by conductor 177' with the binding post 69 to which the other side of the source of supply is connected. The circuit of the electro-magnet is thus completed between the two terminals of the supply source when the contacts 175 and 167 are in engagement. The plunger 174 is slidable in the bracket 173 so as to be reciprocated to bring its contact 175 into and out of contacting range with the contact 167. A spring 178 is interposed between the ear 179 on the bracket and a shoulder 180 on the plunger tending to force the plunger in a direction to remove the contact 175 from position to engage the contact spring 167. This plunger extends in operative relation to an insulating roller 181 which is adapted to be retracted to permit the spring 178 to move the contact 175 out of contacting range with the spring 167 and to be moved against the end of the plunger 174 to throw the contact 175 into such contacting range.

When the contact 175 is in contacting range the circuit of the electro-magnet 160 is made and broken in response to the reciprocation of its armature, such reciprocation causing the reciprocation of the wheel 169 of insulation and the corresponding reciprocation of the spring contact 167 against which it strikes, and the winding of the spring 104 takes place by the stepping forward of the ratchet wheel 153. When, however, the wheel 181 is retracted so that the contact 175 is moved out of contacting range by the spring 178, no winding action takes place. When, however, the roller 181 is moved forward to advance the contact 175 into contacting range with the spring 167, the circuit of the electro-magnet will be made subject to its making and breaking by the reciprocation of the roller 169, when the ratchet wheel will be stepped forward and the winding operation takes place. It will thus appear that the winding of the spring 104 will take place when the roller 181 is advanced against the plunger 174 and that such winding will not take place when the roller 181 is retracted. The means for causing the winding operation to take place at appropriate times may now be described as follows:

The roller 181 is mounted upon a bell crank 182 pivoted upon the shaft 183 mounted in the plate 26 and having an arm 184 extending upwardly and laterally through a hole 185 in the plate 26 and terminating in the roller 181. This bell crank lever also has the arm 186 carrying at its free end the clip 187 broad enough to overhang both the disk 188 and the sector 189. When this end 187 is raised, the roller 181 will be thrown forward to inaugurate the winding operation, and when the end 187 is lowered the roller 181 will be retracted so that the winding operation will be discontinued.

In order to effect this operation the disk 188 is made circular except for a notch 191 within which the plate 187 may fall and cause the retraction of the roller 181 when the disk is in a certain position, the end 187 riding upon the circular periphery of the disk at other times and holding the roller 181 in advanced position to press the plunger 174 against the pressure of the spring 178. The disk 188 is loose upon the shaft 103. The sector 189, however, is fixed upon the shaft 103. Fixed in the side of the spring barrel 102 is the projection 190 adapted to engage, as they are relatively rotated, with the projection 192 fixed in the side of the disk 188. On the opposite side of the disk 188 and directly opposite the projection 192 is a projection 193 adapted to engage with the edge of the sector 189 as the disk and sector are relatively turned. At the end of any winding operation the edge of the plate 187 will drop into the notch 191. The spring 104 will then unwind, the spring barrel 102 turning in the direction of the arrow (Fig. 16) and eventually the projection 190 will come against the side of the projection 192 and the disk 188, being carried along with the spring barrel, will cause the plate 187 to ride out of the notch on to its circular periphery when the roller 181 will be advanced thereby causing the inauguration of the winding operation accomplished by the stepping up of the shaft 103 as before described. As the shaft 103 is thus turned in the re-winding operation it will carry with it the sector 189 which will eventually come against the rear side of the projection 193. The disk 188 will from this point be carried along with the sector 189 and this will continue until the edge of the plate 187 drops into the notch 191 when the turning of the shaft 103, and the winding operation, will stop. This will occur when the projection 192 has moved to a position closely in the rear of the projection 190. The winding operation having thus been stopped the spring barrel 104 will move slowly as the spring unwinds in the direction of the arrow (Fig. 6) until it comes against the projection 192. It will then carry the disk 188 along with it until the clip 187 rides upon the circular periphery of the disk. The winding operation will then be started and continued until the clip 187 again drops into the notch 191. The winding will then cease, the operation of the mechanism under the spring will proceed, the winding will be again inaugurated and terminated and so on indefinitely.

Figs. 15 and 16 respectively show the positions of the parts when the clip 187 has just risen out of the notch and the winding operation has started (Fig. 15) and where the clip has just dropped into the notch (Fig. 15) thereby terminating the winding operation.

It will now appear that the maximum demand pointer being in its zero position, the operator to drive the pointer will be driven by the integrating meter mechanism for a certain period of time, carrying along with it the maximum indicator pointer. At the end of that period the maximum demand indicator operation will be disconnected from the integrating mechanism and will be returned to its initial position by a biasing weight. The maximum demand indicator, however, will remain in the position to which it has been moved by the operator. The operator will immediately be reconnected with the integrating mechanism and will be again driven forward for the predetermined time, and if the consumption of electricity is such during this second period that the total demand for that period is greater than that for the preceding period, the operator will be carried further forward and the maximum demand pointer will be moved further along the scale. If, however, the consumption of electricity in this second period should not be so great as that in the preceding period, the maximum demand pointer will not be moved. The maximum demand pointer operator will thus be moved forward during the periods of a predetermined length and returned to its initial position between each two of such periods, the extent of movement of the pointer operator being governed by the amount of electricity passing through the meter, and the greatest extent of movement of the pointer operator, that is the maximum demand for electricity will be indicated by the maximum demand pointer which remains in the position to which it may be moved by the maximum movement of the pointer operator.

It will further be apparent that the period of connection of the maximum demand pointer operator with the meter mechanism is determined by the energization of a magnet which controls such connection and that the energization of this magnet is controlled by contacts timed by a clock work mechanism which, being operated by a spring, tends to run down like all such mechanisms, and that the electromagnetic means governed by the run down condition of the spring is provided to automatically rewind the spring. In installing the maximum demand indicator, the pivoted carrier comprising the plates 40 and 43 and the posts 44 is turned about its pivot into the position as shown by dotted lines in Fig. 1 when the gear 47 is out of engagement with the spur gear 48. After the maximum demand indicating mechanism has been placed in position, the carrier is turned into the position as shown in full lines in Fig. 1 when the gear 47 will be thrown into mesh with the gear 48 and the maximum demand indicator will be thrown into operation.

The addition of the maximum demand mechanism to the usual registering mechanism of an integrating watt-hour meter, causes the mechanism to extend further out in front. To accommodate this, the usual meter cover 195 (see Fig. 2), which usually encircles and closely grips the tapered flange 196 projecting from the frame of the meter must be arranged to be moved outwardly to accommodate the added mechanism. For this purpose an auxiliary collar 197 is provided, this collar having at its rear side a channel 198 adapted to contain packing material 199. The usual flange 196 on the frame of the meter being embraced in the channel 198 and bearing against the packing material 199 so as to make a tight joint. The cover 195 is then telescoped with and wedged tightly against the forwardly projecting tapered flange 200 of the collar.

Figure 2:
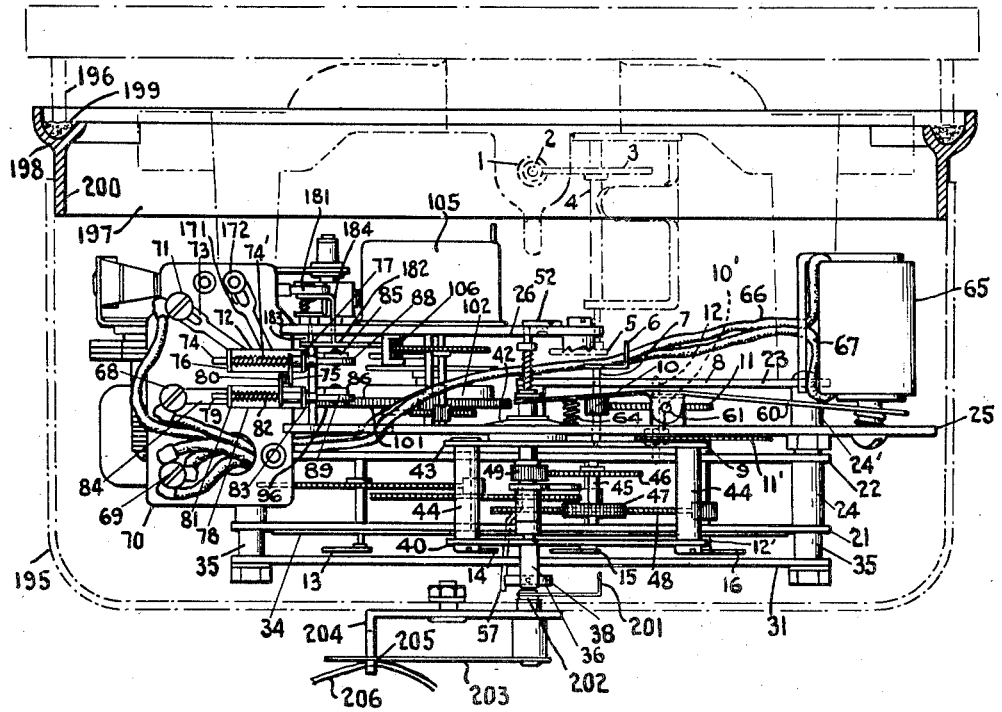
Fig. 2 is a top plan view of the apparatus of Fig. 1, the usual cover and meter frame being shown in dotted lines, and with an adapting ring for the cover shown in cross section.
Figure 1:
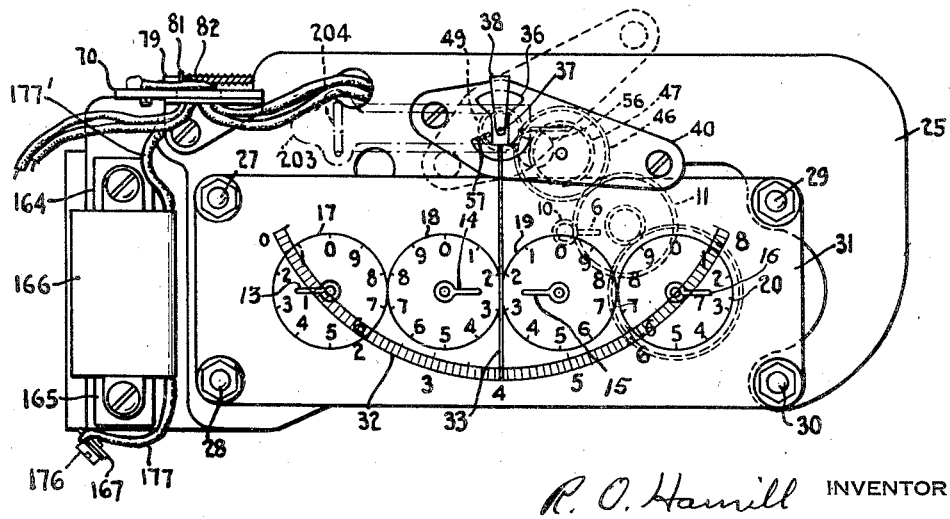
Fig. 1 is a front elevation of mechanism embodying the invention, the front cover of the meter being removed.
Figure 3:
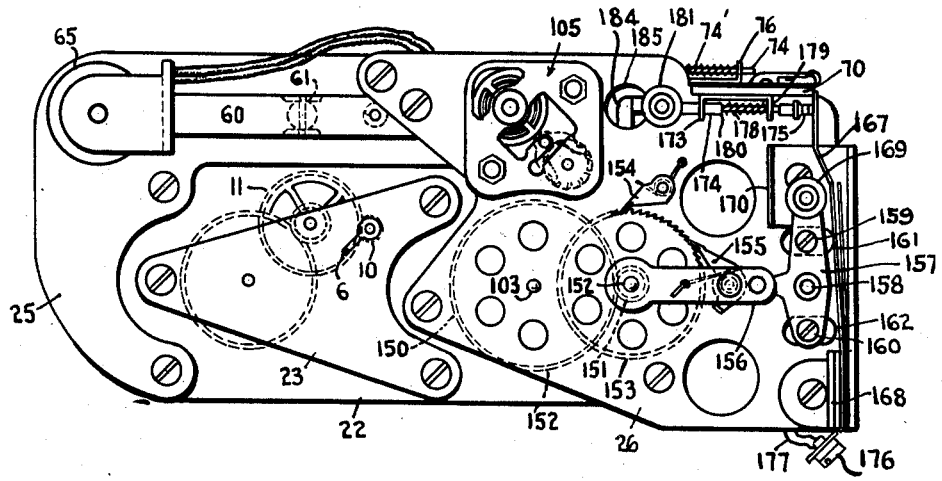
Fig. 3 is a rear elevation of the apparatus of Fig. 1.

The meter reader will read the meter, say once a month, and at that time will observe the maximum demand indication. It is then desired to set the maximum demand pointer to its zero position so that the maximum demand between the time of that reading and the time the next reading is taken may be observed. To effect this operation a crank arm having an end 201 projecting into the path of the maximum demand pointer 33, has its other end fixed upon a shaft 202 rotatably mounted in the meter cover 195, and outside the meter there is fixed to the shaft 202 a handle 203. It will be apparent that by swinging the handle 203 the end 201 will be given a coresponding movement so that by properly turning the handle 203 the indicator 33 may be moved to its zero position. The crank arm is then turned to a position such that its projection 201 is moved beyond any expected movement of the maximum demand indicator. It is secured in this position by means of a bracket 204 fixed upon the cover 195 and adapted to extend through an opening in the handle 203. The handle 203 is flexible so that it may be sprung outwardly to clear the bracket 204 and similarly it may be sprung into position where the end of the bracket 204 projects through the hole in the handle as shown in Fig. 2. The bracket 204 has a hole 205 which is outside the handle 203 when the last has been sprung over the end of the bracket, and the handle may be locked against unauthorized operation to tamper with the indications of the maximum demand indicator, by means of a sealing wire 206 passing through the hole 205 and having its ends sealed together. This prevents the withdrawal of the bracket end from the hole in the handle 203 without breaking the seal and so prevents the operation of the re-set device except upon the breaking of the seal which would, of course, be by an authorized person or the unauthorized use would be apparent.

Referring now to Figs. 8 to 14 inclusive there is therein shown a metering mechanism adapted to be used in relation to an alternating current circuit. As is well known an integrating watt-hour meter for such circuits comprises an alternating current motor driven by the current to be measured, the shaft of the armature being connected by suitable gearing with a series of pointers moving over dials upon which are indicated the watt-hours to be measured.

Referring to the drawings, the shaft 106' of the meter motor rotor carries a worm 107' meshing with the worm wheel 108' fixed upon the shaft 109' rotatably mounted in the post 110' and the bracket 111'. The post 110' and the bracket 111' are fixed in the supporting plate 112'. Carried by the shaft 109' is a worm 113' meshing with a worm wheel 114' fixed upon a shaft 112'' rotatably mounted in the plates 112' and 115', the plate 115' being secured to and spaced from the plate 112' by the posts 110' and 116'. Also fixed upon the shaft 112'' is a spur gear 117' which meshes with a gear 118' fixed on a shaft 119' which is rotatably mounted in a bracket 120' extending from the plate 112', and in the supporting plate 121'. The supporting plates 112' and 121' are secured together and spaced apart by posts 122'. Also fixed upon the shaft 119' is a pinion 123'. Also fixed upon the shaft is the indicating pointer 124' movable over the dial 125'. The pinion 123' meshes with another pinion 126' which drives the well known train of gearing for driving the other pointers 127', 128' and 129' moving over dials in the manner well known in integrating watt-hour-meters.

To provide the maximum demand indication a scale 130' is secured above the usual integrating registers as just referred to. Adapted to move over the scale 130' is a pointer 131' pivoted at 132' and having the counterbalancing weight 133'. This pointer is rotatably mounted on a stationary shaft 134' supported in a bracket 135' secured to the supporting plate 121', and is pressed against the collar 136' fixed upon the shaft 134' by means of a spring 137'. By this means sufficient friction is provided to cause the pointer 131' to remain in whatever position it may be placed.

To move the pointer 131' over the scale 130' to indicate the maximum demand, a projection 138' is fixed to the sleeve 139' and projects into the path of the pointer. Also fixed to the sleeve 139' is an off-center weight 140' tending to move the indicator actuating projection 138' to its initial position. The sleeve 139' is rotatable upon the shaft 142' mounted in the bracket 135'. The actuating projection 138' is driven against the bias of the weight 140' in a direction to actuate the hand 131' by means of a gear 141' fixed on a sleeve 143' rotatable and slidable upon the shaft 142'. This sleeve is rotatable by the meshing of its gear 141' with the gear 144' and is thrown into and out of frictional engagement with the sleeve 139 by shifting it endwise upon the shaft 142'.

The pinion 144' is mounted upon the shaft 145' rotatably mounted in the plates 146' and 147' secured together and spaced apart by the posts 148', the supporting structure comprising the plates 146', 147', and the posts 148' being mounted upon the supporting plate 121'.

The gear 144' meshes with the gear 149' fixed on a shaft 150' rotatably mounted in the plates 148' and 147'. Also fixed upon the shaft 150' is a gear 151' which meshes with one of the gears 126' of the train operating the integrating pointers 124', 127', 128' and 129', when train is driven from the meter motor as has been described.

It is desired that the projection 138' shall move in a direction to advance the maximum demand pointer for a predetermined period of time and then shall return to its initial position and again be moved forward for the predetermined period. The forward movement of the projection is determined by the frictional engagement between the sleeves 139' and 143', the forward movement taking place when such engagement exists and the weight 140' returning the projection to its initial position when there is no such engagement. Accordingly means is provided for sliding the sleeve 143' along the shaft 142', and against the pressure of the spring 152', which spring is interposed between the sleeve 143' and the collar 153' fixed upon the shaft 142'. Thereby the frictional engagement between the sleeve 143' and 131' is destroyed and this condition is allowed to prevail for a sufficient length of time to permit the operating projection 138' for the maximum demand pointer to be returned to its initial position by the weight 140'. The sleeve 143' is then released so that it may be forced against the sleeve 139' by the spring 152' when the frictional engagement of the two sleeves will cause the projection 138' to be driven forward against the bias of the weight 140'. This condition of forward driving is maintained for a certain predetermined period of time when the sleeve 139' is again released and the projection 138' returned to its initial position. To accomplish these results of clutching and unclutching the sleeves 139' and 141', a lever 154' is pivoted at 155' in the plate 156' fixed to the plate 112'. This lever 154' has a forked end 157' engaging in the groove 158' in the sleeve 143'. The other end of the lever, also having a forked end 159', embraces the shaft 160' rotatably mounted in the plates 156' and 161', the latter plate being secured to and spaced from the plate 156' by post 162'. The forked end 159' of the lever is pressed by the spring 163' against the collar 164' which is loose upon the shaft but turns therewith by reason of the fact of diametric ribs 165' on the boss 166' of the gear 167' engaging in corresponding recesses in the flat collar 164', the boss 168' and gear 167' being fixed to the shaft 160'. The spring 163' normally holds the forked end 159' flatly against the collar 164' and the collar in a plane substantially perpendicular to the axis of the shaft 160'. The collar 164', however, may be tilted upon the ribs 165' (see Fig. 12) by means of a rotating cam 168' coming into engagement with a lug 169' on an arm 170' projecting from the collar 164'. When the collar 164' is so tilted it will be apparent that the forked end of the lever 159' will be shifted along the shaft 160' whereupon the lever 154' will be turned about its pivot and its forked end 157' will draw the sleeve 141' out of engagement with the sleeve 139'.

The cam 168 is fixed upon a shaft 171' rotatably mounted upon brackets in the plate 161' and carrying the worm 172' and the worm wheel 173'. The worm 172' engages with the gear or worm wheel 167', while the worm wheel 173' cooperates with the worm 174' fixed on the shaft 175' rotatably mounted in the supporting plates 156' and 161'. Also fixed upon the shaft 175' is a gear 176' meshing with a gear 177' on the rotatable shaft of the alternating current motor 178'. This rotor comprises the notched iron disk 179' rotating between the notched pole pieces 180' and connected with the brass barrel 210 by a spring 211 within the barrel having one end secured to the barrel and the other end to the iron disk. The iron disk is loosely mounted on the shaft 212 while the barrel is fixed to the shaft and is adapted to act as a fly weight. The spring provides a flexible connection permitting the iron disk to fluctuate quickly independently of the weight of the barrel, shaft etc. These pole pieces are connected respectively by the iron limbs 181' with the ends of the laminated iron core 182' of the coil 183'. The pole pieces are secured to the iron plate 156' and the rotor is rotatably mounted in the plates 156' and 161'. The terminals 184' are to be connected across a phase of alternating current and when this is done, and the rotor is given a start to bring it up to synchronous speed, it will then be driven by the stator at a speed bearing a fixed relation to the frequency of the alternating current supplied to the stator coil, i. e. will be maintained in synchronism for reasons as are well understood in connection with alternating current electric motors. Also the speed at which the rotor will be driven will be dependent upon the design of the rotor and stator as is well understood in the art of alternating current electric motors.

The motor being in operation it will rotate the worm 172' and the cam 168'. The motor will therefore rotate the gear 167' and with it the collar 164'. The ratio of movement is so designed that the collar 164' will move a very slight part of a revolution while the cam 168' is making a revolution. When, therefore, the collar 164' is in position such that the lug 169' is in registry with the cam 168' the latter will engage the lug, tilt the collar and disengage the sleeve 139' and 141', permitting the maximum demand indicator actuator to be returned to its initial position by the biasing weight. As soon, however, as the momentary registration of the lug 169' and the cam 168' has passed, the collar 164 will again resume its normal position and the actuator for the maximum demand pointer will be again connected in driving relation to the meter motor mechanism and will continue its advance until the lug 169' is again actuated by the cam 168'. It will be apparent that the lug 169' will be actuated by the cam 168' once for each revolution of the collar 164'. The construction is therefore made such that the time of revolution of the collar 164' will be the time during which it is desired that the actuator for the maximum demand pointer shall be advanced.

It will be apparent that the alternating synchronous motor driving the collar 164' will be the timing mechanism because the frequency being a fixed number of alternations per second and the revolutions of the motor (and connected apparatus) bearing a fixed relation to the frequency, the operations will be appropriately timed.

A meter having the mechanism as shown in Figs. 8 to 14 inclusive has the usual front cover 215. In order to reset the maximum demand indicator 131' to zero when desired, as set forth in connection with the construction of Figs. 1 to 7 inclusive 15, 16 and 17, a similar construction may be employed in relation to the apparatus of Figs. 8 to 14 inclusive. Thus, referring to the apparatus of the latter figures, there is provided a crank arm having the projection 216 adapted to project into the path of the maximum demand indicator 131', the other end of the crank arm being fixed to the shaft 217 rotatably mounted in the cover 215. The crank arm 216 is upon the interior of the cover while at the outer end of the shaft 217, upon the exterior of the cover, is fixed the handle 218 having an opening through which may project an arm of the bracket 219 fixed upon the cover 215. The handle 218 is flexible so that it may bend outwardly to clear the bracket 219 or allowed to move inwardly so that the bracket enters within the hole in the handle. With the handle clear of the bracket, the shaft 217 may be turned to bring the crank 216 against the maximum demand indicator 131' and reset it to the zero position. When the resetting device is not in use it is turned into position such that the bracket 219 may enter within the hole in the handle 218 when the crank arm 216 will be removed from any expected path of movement of the maximum demand indicator. The resetting device may be locked in this position so as to prevent tampering by unauthorized persons, by means of a wire 220 passing through a hole in the bracket 219 outside of the handle 218 and thereby preventing the handle from being removed from the bracket. The wire 220 may be sealed in the well understood way.

In Figures 18 and 19 is shown a modified construction whereby the clutch for securing the operator for the maximum demand pointer, to its shaft, is operated directly by the timing device instead of being operated from the timing device by means of cam-operated contacts, an electro-magnet etc.

Referring to Figs. 18 and 19, the plate 26 has pivoted upon it the bell crank lever 182 extending through the plate 26 and adapted to operate the spring-pressed plunger 181 which controls the winding of the timing mechanism as described in connection with the structure of Figs. 1 to 7, 15, 16 and 17. This bell crank lever 182 is adapted to have its arm 186 raised and lowered by means of the cam 188, which cam is loose upon the shaft 103. Encircling the shaft and connected thereto by the coiled flat spring is the barrel 102. This spring, when wound, constitutes the driving means for the timing mechanism. Fixed to the drum is a gear 101 through which connection is established with an escapement timing mechanism as described in connection with Figs. 1 to 7, 15, 16 and 17.

As described in connection with the figures last referred to, there is a projection 190 on the barrel 102 which, as the driving spring unwinds, comes against a projection 192 on the disk 188 and moves the same to cause the end of the arm 186 to move out of the notch 191 thereby starting the winding operation and turning the shaft 102 to rewind the spring. Fixed upon the shaft 103 is a sector 189 so that as the shaft is turned in the winding operation it comes against the pin 193 in the loose disk 188 and turns the same until the end of the bell crank arm 186 again drops into the notch when the winding will cease. The apparatus thus far described and the operations referred to thus far take place in precisely the same manner as described in connection with Figs. 1 to 7 inclusive 15, 16 and 17.

Also in the apparatus of Figs. 18 and 19, as in the structure of Figs. 1 to 7 inclusive, 15, 16 and 17, the projection 57 for engaging and operating the maximum demand pointer is secured on the sleeve 54 rotatably mounted on the shaft 51 and bearing against the collar 53 fixed upon the shaft 51, the sleeve 54 having the laterally extending weight 56 biasing the operating projection 57 to an initial position. Also, as in the structure of Figs. 1 to 7 inclusive, 15, 16 and 17, a gear 49 fixed to the longitudinally slidable sleeve 50 is adapted to engage with the integrating watt-hour-meter mechanism. Also, as in the figures of the drawings referred to, frictional driving connection is established with the sleeve 54 by means of the pressing of the sleeve 50 endwise against the sleeve 54 by the spring 58. The sleeve 50 has a head 63 against which an actuating element is adapted to bear to move the sleeve against the spring 58 to break the frictional driving connection between the sleeve 50 and the sleeve 54.

Instead, however, of having this movement of the sleeve 50 against its spring caused by means of a lever-operated by an electro-magnet controlled by timed contacts, such movement of the sleeve to unclutch the driving connection of the maximum demand pointer operator, is accomplished directly from the movement of the timing mechanism. To thus operate the clutch, a dog 230 is fixed upon the shaft 231 and extends within the head 63. Also fixed upon the shaft is an arm 233 into which is screwed the adjustable socket 234 for receiving the end of the rod 235. As the rod 235 is raised the shaft 231 will be turned in the brackets 232 and 232', and the dog 230 will be thrown against the head 63 thereby moving the sleeve 50 away from the sleeve 54 whereupon the last mentioned sleeve will be uncoupled from its driving mechanism and will be returned by the weight 56 to its initial position. The lower end of the rod 235 fits loosely within a socket 236 fixed on the end of the vertical shaft 237 which slides in the bracket 238 fixed upon the plate 26. The shaft 237 at its lower end rests upon the plate 187 at the end of the bell crank arm 186. This bell crank arm, as fully explained in connection with Figs. 1 to 7 and 15, 16 and 17 rides upon the periphery of the disk 188, being lowered when it falls into the notch 191 and raised when it rides out of that notch onto the periphery of the cam. It was also described in connection with those figures how the winding of the main spring was initiated by the riding of the plate out of the notch on the cam and was terminated by the falling of the plate into the notch; and further that the riding of the plate out of the notch was occasioned by a projection on the spring barrel coming against a projection on the cam. It was further described how when the winding of the spring had been started by the riding of the plate out of the notch, the shaft to which the inner end of the spring is secured was rapidly turned until the plate on the bell crank arm dropped into the cam notch. From this it appeared that at certain predetermined time intervals the winding of the spring (which involved the turning of the segment 189) took place. In the modification of Figs. 18 and 19 this circumstance is taken advantage of to cause the disengagement of the clutch for driving the actuator for the maximum demand pointer at predetermined intervals of time and effecting this by the relatively fast moving segment 189 so that the clutch disengagement is for a very short period as required to permit the said actuator to be returned to its initial position by the weight 56. To accomplish this result the segment 189 is made of a greater radius than the circular periphery of the cam 188 so that its surface 238 projects outwardly beyond the surface of the cam 188. When, therefore, the segment is rotated in the winding operation, it will, in passing (comparatively rapidly) beneath the plate 187 raise that plate off the cam 188. After the passage of the segment 189, the plate 187 will drop back again upon the cam 188. This raising of the plate 187 will lift the shaft 237 and turn the shaft 231 whereupon the dog 230 will be thrown against the sleeve head 63 thereby moving the sleeve 50 away from the sleeve 54 and breaking the friction clutch between those two sleeves whereupon the sleeve 54 carrying the pointer actuator will be returned to its initial position by the bias of the weight 56.

When the plate 187 drops on to the cam 188 after the passage of the segment 189, the sleeve head 63 will be relieved of the pressure of the dog 230 when the spring 58 will reestablish the frictional clutch between the sleeves 50 and 54.

While the invention has been illustrated in what are considered its best applications it may have other embodiments without departing from its spirit and is not therefore limited to the structures shown in the drawings.

What I claim is:

1. The combination with a watt-hour integrating meter mechanism, of a maximum demand indicator and mechanism for operating said indicator adapted to be moved into and out of operative relation to said first mentioned mechanism at will.

2. The combination with a motor driven watt-hour integrating meter mechanism, of a maximum demand indicator, means for operating said indicator and gearing for driving said indicator operating means, said gearing being mounted in a frame pivoted about the axis of said indicator operating means and movable about its pivot to throw the said gearing into and out of operative relation to the said watt hour integrating mechanism.

3. The combination with a watt-hour integrating meter mechanism comprising indicating hands, of dials in operative relation to said hands, a maximum demand indicating hand operatively related to said mechanism and a maximum demand scale in operative relation to said maximum demand indicating hand, said scale being upon a transparent plate superposed over said dials whereby said dials are viewed through said plate.

4. In a maximum demand indicator, the combination with a maximum demand indicating hand, of an actuator therefor loosely mounted on a shaft and means biasing said actuator to an initial position, a clutch member slidable upon said shaft to establish and disestablish driving connection with said actuator and a shoulder on said shaft adapted to limit the movement of said actuator toward said clutch member along the shaft in the disengaging operation.

5. In a maximum demand indicator, a detachable unitary structure adapted to be attached to and detached from an integrating watt-hour meter comprising in combination a frame and gearing mounted thereon adapted to be operated by the integrating watt-hour meter motor, a maximum demand indicator hand, operating means for said maximum demand indicator hand, means for intermittently connecting said operating means for the maximum demand indicator hand with the said mechanism, said hand operating means and said means for intermittently connecting said operating means with the mechanism being mounted on said frame and timing means controlling the intermittent connection of the operator for the maximum demand hand with said mechanism, said timing means being mounted on said frame.

6. In a maximum demand indicator, a detachable unitary structure adapted to be attached to and detached from an integrating watt-hour meter comprising in combination a frame and gearing mounted thereon adapted to be operated by the integrating watt-hour meter motor, a maximum demand indicator hand, operating means for said maximum demand indicator hand, means for intermittently connecting said operating means for the maximum demand indicator hand with the said mechanism, said hand operating means and said means for intermittently connecting said operating means with the mechanism being mounted on said frame and electrically controlled timing means controlling the intermittent connection of the operator for the maximum demand hand with said mechanism, said timing means being mounted on said frame.

7. In a maximum demand indicator, a detachable unitary structure adapted to be attached to and detached from an integrating watt-hour meter comprising in combination a frame and gearing mounted thereon adapted to be operated by the integrating watt-hour meter motor, a maximum demand indicator hand, operating means for said maximum demand indicator hand, means for intermittently connecting said operating means for the maximum demand indicator hand with the said mechanism, said hand operating means and said means for intermittently connecting said operating means with the mechanism being mounted on said frame and timing means controlling the intermittent connection of the operator for the maximum demand hand with said mechanism, said timing means being mounted on said frame, watt-hour indicating pointers connected with said gearing and dials in operative relation to said pointers.

8. In a maximum demand indicator, a detachable unitary structure adapted to be attached to and detached from an integrating watt-hour meter comprising in combination a frame and gearing mounted thereon adapted to be operated by the integrating watt-hour meter motor, a maximum demand indicator hand, operating means for said maximum demand indicator hand, means for intermittently connecting said operating means for the maximum demand indicator hand with the said mechanism, said hand operating means and said means for intermittently connecting said operating means with the mechanism being mounted on said frame and electrically controlled timing means controlling the intermittent connection of the operator for the maximum demand hand with said mechanism, said timing means being mounted on said frame, watt-hour indicating pointers connected with said gearing and dials in operative relation to said pointers.

9. In a maximum demand indicator, a detachable unitary structure adapted to be attached to and detached from an integrating watt-hour meter comprising in combination a frame and gearing mounted thereon adapted to be operated by the integrating watt-hour meter motor, a maximum demand indicator hand, operating means for said maximum demand indicator hand, means for intermittently connecting said operating means for the maximum demand indicator hand with the said mechanism, said hand operating means and said means for intermittently connecting said operating means with the mechanism being mounted on said frame and timing motive means controlling the intermittent connection of the operator for the maximum demand hand with said mechanism, said timing motive means being mounted on said frame.

10. In a maximum demand indicator, a detachable unitary structure adapted to be attached to and detached from an integrating watt-hour meter comprising in combination a frame and gearing mounted thereon adapted to be operated by the integrating watt-hour meter motor, a maximum demand indicator hand, operating means for said maximum demand indicator hand, means for intermittently connecting said operating means for the maximum demand indicator hand with the said mechanism, said hand operating means and said means for intermittently connecting said operating means with the mechanism being mounted on said frame and electrically controlled timing motive means controlling the intermittent connection of the operator for the maximum demand hand with said mechanism, said timing motive means being mounted on said frame.

11. In a maximum demand indicating means, the combination with mechanism adapted to be operated by the motor of an integrating watt hour meter, of hands and cooperating dials for indicating the integrated watt hours, operatively connected with said mechanism, a maximum demand indicating pointer biased to an initial position, an actuator for said pointer, means for intermittently connecting said actuator in operative relation to said mechanism, a magnet controlling said connecting means, circuit connections and contacts controlling the circuit of said electro-magnet, cams for operating the contacts controlling the circuit of said electro-magnet and a spring motor operating said cams.

12. In a maximum demand indicating means, the combination with mechanism adapted to be operated by the motor of an integrating watt hour meter, of hands and cooperating dials for indicating the integrated watt hours, operatively connected with said mechanism, a maximum demand indicating pointer biased to an initial position, an actuator for said pointer, means for intermittently connecting said actuator in operative relation to said mechanism, a magnet controlling said connecting means, circuit connections and contacts controlling the circuit of said electro-magnet, cams for operating the contacts controlling the circuit of said electro-magnet and a spring motor operating said cams and means controlled by the run-down condition of said spring for rewinding the spring.

13. In a maximum demand indicating means, the combination with mechanism adapted to be operated by the motor of an integrating watt-hour meter, of hands and cooperating dials for indicating the integrated watt-hours, operatively connected with said mechanism, a maximum demand indicating pointer biased to an initial position, an actuator for said pointer, means for intermittently connecting said actuator in operative relation to said mechanism, a magnet controlling said connecting means, circuit connections and contacts controlling the circuit of said electro-magnet, cams for operating the contacts controlling the circuit of said electro-magnet and a spring motor operating said cams, said actuator being connected with said mechanism when said electro-magnet is energized and disconnected therefrom when said electro-magnet is de-energized.

14. In a maximum demand indicating means, the combination with mechanism adapted to be operated by the motor of an integrating watt-hour meter, of hands and cooperating dials for indicating the integrated watt-hours, operatively connected with said mechanism, a maximum demand indicating pointer biased to an initial position, an actuator for said pointer, means for intermittently connecting said actuator in operative relation to said mechanism, a magnet controlling said connecting means, circuit connections and contacts controlling the circuit of said electro-magnet, cams for operating the contacts controlling the circuit of said electro-magnet and a spring motor operating said cams and means controlled by the run-down condition of said spring for rewinding the spring, the last mentioned means comprising an electro-magnet, a reciprocating armature therefor, a pawl reciprocated by said armature, a ratchet wheel engaging therewith to be stepped forward to wind the spring, a circuit, and contacts in the circuit of the last mentioned electro-magnet and controlled by its reciprocating armature to intermittently make and break the circuit of the last mentioned electro-magnet.

RET O. HAMILL.